(12) United States Patent
Epstein et al.

(10) Patent No.: US 8,321,888 B2
(45) Date of Patent: Nov. 27, 2012

(54) TV TUTORIAL WIDGET

(75) Inventors: Karen Epstein, Encino, CA (US); Ling Jun Wong, Escondido, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 431 days.

(21) Appl. No.: 12/321,094

(22) Filed: Jan. 15, 2009

(65) Prior Publication Data

US 2010/0180292 A1 Jul. 15, 2010

(51) Int. Cl.
*H04N 7/10* (2006.01)
*H04N 7/025* (2006.01)

(52) U.S. Cl. ............. 725/32; 725/40; 725/51; 725/112; 725/115; 725/116; 725/135; 725/136

(58) Field of Classification Search .............. 725/32, 725/40, 51, 112, 115–116, 135–136
See application file for complete search history.

(56) References Cited

U.S. PATENT DOCUMENTS

| 4,622,013 A | 11/1986 | Cerchio |
| 6,909,874 B2 | 6/2005 | Holtz et al. |
| 2003/0009771 A1 * | 1/2003 | Chang .......................... 725/135 |
| 2004/0123325 A1 * | 6/2004 | Ellis et al. ........................ 725/91 |
| 2004/0133532 A1 | 7/2004 | Seitz et al. |
| 2005/0239036 A1 | 10/2005 | McGar et al. |
| 2006/0172275 A1 | 8/2006 | Cohen |
| 2007/0166688 A1 | 7/2007 | Leonard et al. |
| 2007/0209047 A1 * | 9/2007 | Hallberg et al. .................. 725/9 |
| 2008/0016385 A1 * | 1/2008 | Hollingsworth et al. ......... 714/3 |
| 2008/0163307 A1 * | 7/2008 | Coburn et al. .................. 725/61 |

* cited by examiner

*Primary Examiner* — Pankaj Kumar
*Assistant Examiner* — Charles N Hicks
(74) *Attorney, Agent, or Firm* — Miller Patent Services; Jerry A. Miller (57) ABSTRACT

In certain implementations, a television tutorial Widget method involves providing a tutorial Widget running on a television processor to produce video images rendered as a video overlay that overlays the picture on a television display. The tutorial Widget: loading upon receipt of a command to run the tutorial Widget; identifying an operating state of the television set; retrieving and presenting a list of available tutorial videos associated with the operating state of the television set in the video overlay; identifying a tutorial video selected by a user; and retrieving and playing the tutorial video selected by the user in the video overlay. This abstract is not to be considered limiting, since other embodiments may deviate from the features described in this abstract.

24 Claims, 10 Drawing Sheets

TV TUTORIAL WIDGET

COPYRIGHT AND TRADEMARK NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever. Trademarks used herein are the property of their respective owners.

BACKGROUND

The television (TV) has undergone many changes in the last several years. As conversion to digital and high definition broadcasts takes place, customers will be storming the market for a new TV set. Many will be consumers accustomed to simple conventional TV sets and will receive a culture shock when they see what the TV's of today (and tomorrow) are capable of. Many users don't like to read manuals. Others see certain features of the TV as too complicated to figure out, and may avoid a specific feature altogether.

BRIEF DESCRIPTION OF THE DRAWINGS

Certain illustrative embodiments illustrating organization and method of operation, together with objects and advantages may be best understood by reference detailed description that follows taken in conjunction with the accompanying drawings in which.

DETAILED DESCRIPTION

While this invention is susceptible of embodiment in many different forms, there is shown in the drawings and will herein be described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically. The term "program" or "computer program" or similar terms, as used herein, is defined as a sequence of instructions designed for execution on a computer system. A "program", or "computer program", may include a subroutine, a function, a procedure, an object method, an object implementation, in an executable application, an applet, a servlet, a source code, an object code, a shared library/dynamic load library and/or other sequence of instructions designed for execution on a computer system.

The term "program", as used herein, may also be used in a second context (the above definition being for the first context). In the second context, the term is used in the sense of a "television program". In this context, the term is used to mean any coherent sequence of audio video content such as those which would be interpreted as and reported in an electronic program guide (EPG) as a single television program, without regard for whether the content is a movie, sporting event, segment of a multi-part series, news broadcast, etc. The term may also be interpreted to encompass commercial spots and other program-like content which may not be reported as a program in an electronic program guide.

Reference throughout this document to "one embodiment", "certain embodiments", "an embodiment", "an example", "an implementation" or similar terms means that a particular feature, structure, or characteristic described in connection with the embodiment, example or implementation is included in at least one embodiment, example or implementation of the present invention. Thus, the appearances of such phrases or in various places throughout this specification are not necessarily all referring to the same embodiment, example or implementation. Furthermore, the particular features, structures, or characteristics may be combined in any suitable manner in one or more embodiments, examples or implementations without limitation.

The term "or" as used herein is to be interpreted as an inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

With the rapidly increasing complexity and higher levels of functionality being provided via television devices, a better mechanism is needed to assist users in adapting to the rapidly increasing complexity and functionality. As a result of the high degree of reliability of television sets, those who purchase new television sets today may not have had need to do so for ten years or more. For such users, the changes can be profound. In addition to control over various levels of definition and varying home theater audio standards, the new user may have to adapt to personal video recorder (PVR) operation, extensive menu driven functionality, pay per view and Internet protocol television (IPTV) channels.

Figure 1:
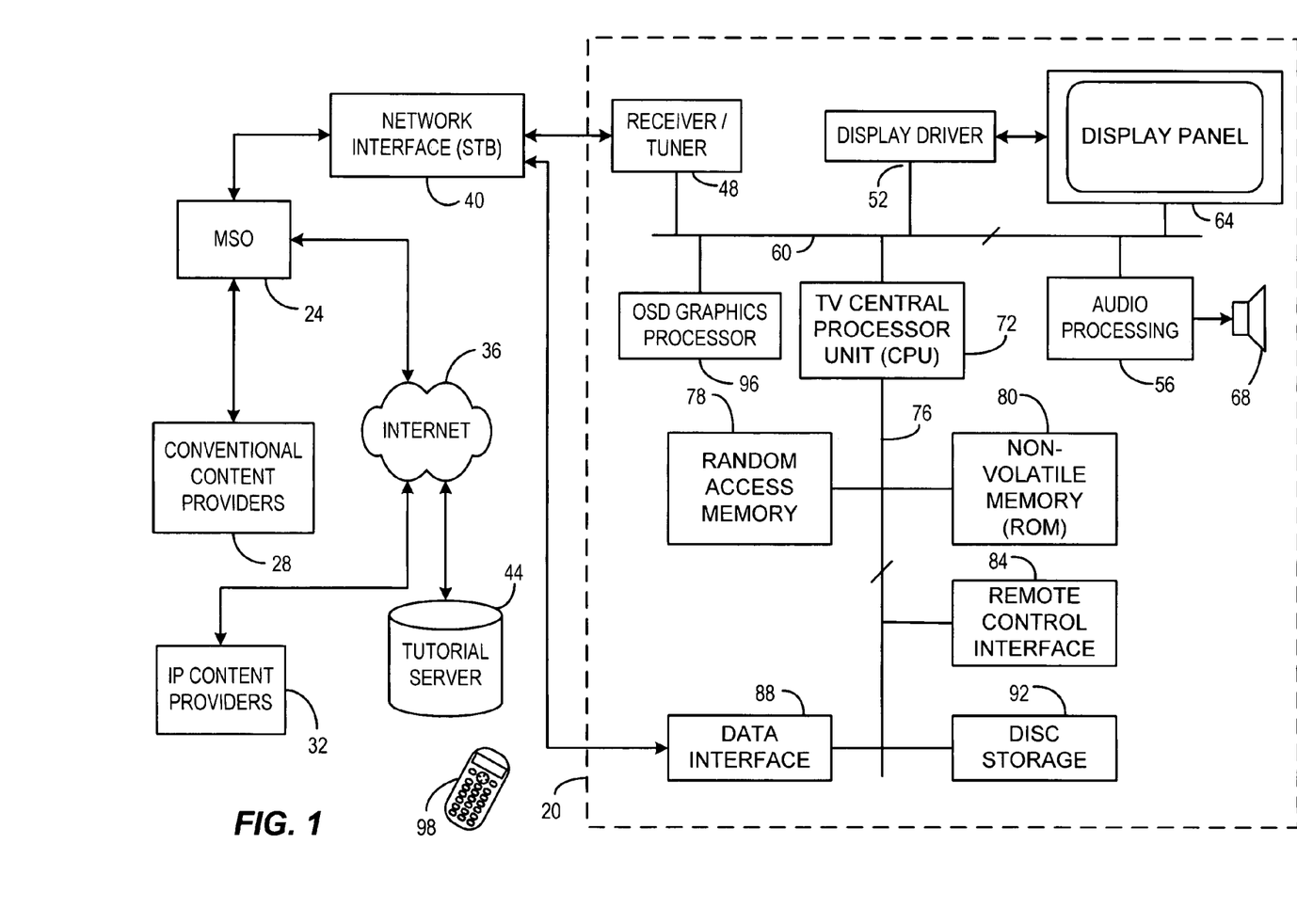
FIG. 1 is an example block diagram of a television system consistent with certain implementations of the present invention.

One example implementation of a television system consistent with certain embodiments is depicted in FIG. 1. In this embodiment, a television receiver 20 may in various ways receive television programming content. While not shown in this example, broadcast digital television signals could be received via an antenna and a separate Internet connection such as via digital subscriber line (DSL) telephone service can be used, and other variations are possible. As shown, the television receiver is interfaced to a multiple service operator (MSO) 24 such as a cable or satellite operator or some combination thereof in order to receive content prepared by the MSO or by local, regional, national or global conventional content providers depicted generally as 28. In addition, there is a growing body of services that provide television consumable programming via Internet Protocol (IP) that may be accessed in this example via the MSO 24 through IP content providers 32 that distribute their content over the Internet 36. In this example, such content is received via a data modem internal to a network interface 40 such as a television set top box (STB) having an internal high speed modem. But, it is not necessary that these services be directly bundled in order to provide the present services.

In addition to access to an array of content via the Internet 36 and via traditional TV content providers 28, in certain implementations, tutorials are available either locally as will be described, or from a remote tutorial server 44 in order to enhance the user's television function awareness and minimize need to contact customer support call centers for assistance in operation or setup of the television.

Television 20 depicts generally some of the components of a digital modern television set that is compatible with both conventional programming and Internet Protocol Television (IPTV). Those skilled in the art will appreciate upon consideration of the present teachings that some of the functionality depicted can be implemented in a modular fashion or can be implemented using external functional features that form a part of the network interface 40, or the network interface 40 components can be integrated into television 20 in various configurations without limitation.

In the example shown, TV 20 has a receiver/tuner section 48 that receives and decodes (and possibly decrypts) content for consumption by the television 20. The receiver/tuner's output is provided to a display driver 52 and an audio processor 56, possibly directly or via a bus 60. The display driver 52 drives a display panel or other display element 64 while the audio processing circuit 56 either drives an internal speaker or speakers 68 or provides an output signal used by an external sound system such as a home theater system (for purposes of this document, all of which are represented by speaker 68).

The TV 20 includes a TV processor having a programmed central processing unit (CPU) 72 with an associated bus 76 (being in addition to or the same as bus 60) used to connect the central processor unit 72 to Random Access Memory (RAM) 78 and/or Non-Volatile Memory (e.g., Read Only Memory (ROM) and/or electrically erasable flash memory) 80 in a known manner. A remote control interface 84 and other user interfaces may be provided for the input of information by the user. TV 20 may also a data interface 88 for communication using Internet Protocol for IPTV and tutorial processing. The TV 20 may also incorporates disc storage 92 or other mass storage such as solid state memory devices for storing large amounts of information including, but not limited to, program files and data files and tutorial videos including the tutorial programming discussed hereinafter. An On Screen Display (OSD) graphics processor 96 is provided for rendering graphics as is used in the present tutorial example as well as electronic programming guides (EPGs) and other functions can also be provided as shown. A remote controller 98 is provided to facilitate ease of use and provide a convenient familiar user interface. Any of multiple bus connections arrangements can be used to provide the interfaces needed among the various components as disclosed herein; hence the bus structure shown is intended to be merely illustrative.

As noted above, given this rapid increase in complexity and programmable functionality of a television set, a mechanism for providing tutoring to new users is needed to accomplish simplifying the experience and encourage users to take advantage of the newly available functionality. Implementation examples presented herein utilize a "Widget" to provide this tutorial function. For purposes of this document, the term "Widget" is used to mean a lightweight software application that is designed to operate in a television receiver environment that is available to carry out various dedicated functions for the user. In the modern TV environment, such programs may interact with storage, the Internet, a cable or satellite system, other TV related software and hardware components responsible for the normal functioning of the TV through a specific interface, other Widgets on the TV or other entities to carry out various functions for the convenience of the user. The user can launch or terminate such Widgets by selecting them from a menu, through user input via a key on the TV's remote control, voice activation, gesture activation or the like, through an automatic contextual launch where the TV program deemed as appropriate or other interface in order to access or restrict their functionality in the television environment. The "Widget" may exist as a program independently on the system, or on a common Widget platform where global variables may affect the Widget in terms of functionality, operability, visibility or the like. The Widget operates as a computer program running on the TV central processor 72 or on another processor within the television 20.

Widgets can be used like a computer program by a TV viewer to implement functions that have not been available to the user the TV user in the past. For example, a Widget can be developed to provide access to email, provide weather forecasts, provide clock functions, provide RSS feeds, display a photo album, or some other content that is being received via the web which displayed on the TV with the proper means, etc.

This present video tutorial Widget allows the user to fully enjoy and understand all of the features of the TV in order to optimize user experience while bringing down the amount of calls to a service call center in reference to the TV, or to an Internet video service such as Sony's Bravia™ Internet Video Link (BIVL) service.

In certain implementations, the tutorial can be implemented as an overlay which is used to display a detailed video demonstration of how to use a specific feature or menu option on the television. For purposes of this document, the term "overlay" is used to mean a software platform that exists on top of the other TV applications. This platform can be made visible or invisible at the user's discretion, as well as apply other non-limiting global controls to all Widgets that reside on it. Further, this platform runs as a separate process from the TV's native applications. As such, the overlay is an isolated tool ideally used to present the video demonstration on top of other running TV applications because the overlay has minimal interaction with and dependency on the TV native applications. This allows the platform to be easily used regardless of what native TV application is currently running, which makes it an ideal choice for hosting the video tutorial Widget as it can be shown or hidden at any time. Also, this platform allows Widgets to be freely loaded and unloaded to achieve certain functions as well as to free up unnecessary memory. For example, when the video tutorial Widget is loaded, the clock and weather Widget are probably not needed at this time, therefore, they're being temporarily unloaded by the platform to free up memory to host the video tutorial Widget. Upon unloading of the video tutorial Widget, previously unloaded Widgets can be restored.

The user can call upon this tutorial feature when he/she is trying to use a feature on the TV and is uncertain or confused about a specific menu option, or can be directly addressed as one or a series of video tutorials from a main menu function in order to learn about the capabilities of the TV. The tutorial overlay appears when a specified function key is actuated from the remote controller 98 and can be hidden when it is no longer needed. In certain embodiments, this feature adds an overlay to a cross media bar (XMB) homepage, but could be implemented using other mechanisms.

A tutorial consistent with certain implementations can be implemented using the added overlay platform, while the underlying platform of the XMB can remain fixed. In such an implementation, the tutorial can be activated or deactivated at anytime during the navigation of the TV. When a help command, is either user activated, say from the designated help button on the remote control, or contextually activated, the video tutorial Widget with the relevant video tutorial content can be loaded onto the Widget overlay, possibly after unloading other unnecessary Widgets existing on the platform. Upon loading completion, the platform is made visible to the user, displaying the video tutorial requested. The video tutorial can be paused, fast forwarded, rewound or any other non-limiting controls relevant to a video player. Further, when the video is paused, the user can hide the platform by hitting the designated "hide" button on the remote control, after which, the user follows the instructions that was previously shown on the video, for example, navigate to the "settings" section of the XMB and entering the "Picture" section for screen display settings. When the platform is hidden, the video tutorial Widget is automatically paused even when it was previously playing. To resume, the user hits the designated "show" button on the remote control to bring up the Widget platform overlay again. The video can then be automatically resumed from its previous state to continue with the same help video. When the video tutorial is terminated, or when the user completes the tutorial video, the previously unloaded Widget is again reloaded onto the Widget platform overlay. The TV then returns to its previous state.

In certain implementations, the video tutorial has a main introduction/overview of the TV and of the functionality of the menu items of the TV. This tutorial takes into account that the IPTV functionality (e.g., Sony's BIVL technology) will eventually be integrated directly into the TV, in which case the tutorial can include a portion for the IPTV functionality.

In one implementation, when the user first turns on his TV, there is an optional help button on the remote control, and/or a menu item that he can choose from the XMB or other menu system to launch the video tutorial. In that case, the tutorial begins as an overview of the XMB or other menu system and all of the features of the TV. The user is provided with the ability to pause the video at anytime, in which case the video will be hidden, so the user can continue to explore the TV or make use of information just learned from the video on his own, and thereby configure the menu options that were just demonstrated to him in the tutorial.

In another implementation or in addition, specific shorter and more focused tutorials on specific menu items can be provided. For example, a user may be navigating through a setup menu and see various configuration options. The user might not know what would happen a specific configuration option is enabled or disabled. In this case, a video tutorial for that particular feature can be invoked. The user can press a remote controller button and launch a brief animated explanation of what that specific feature does. In addition, accompanying text can provide step by step explanation or instructions for accomplishing particular actions.

Figure 2:
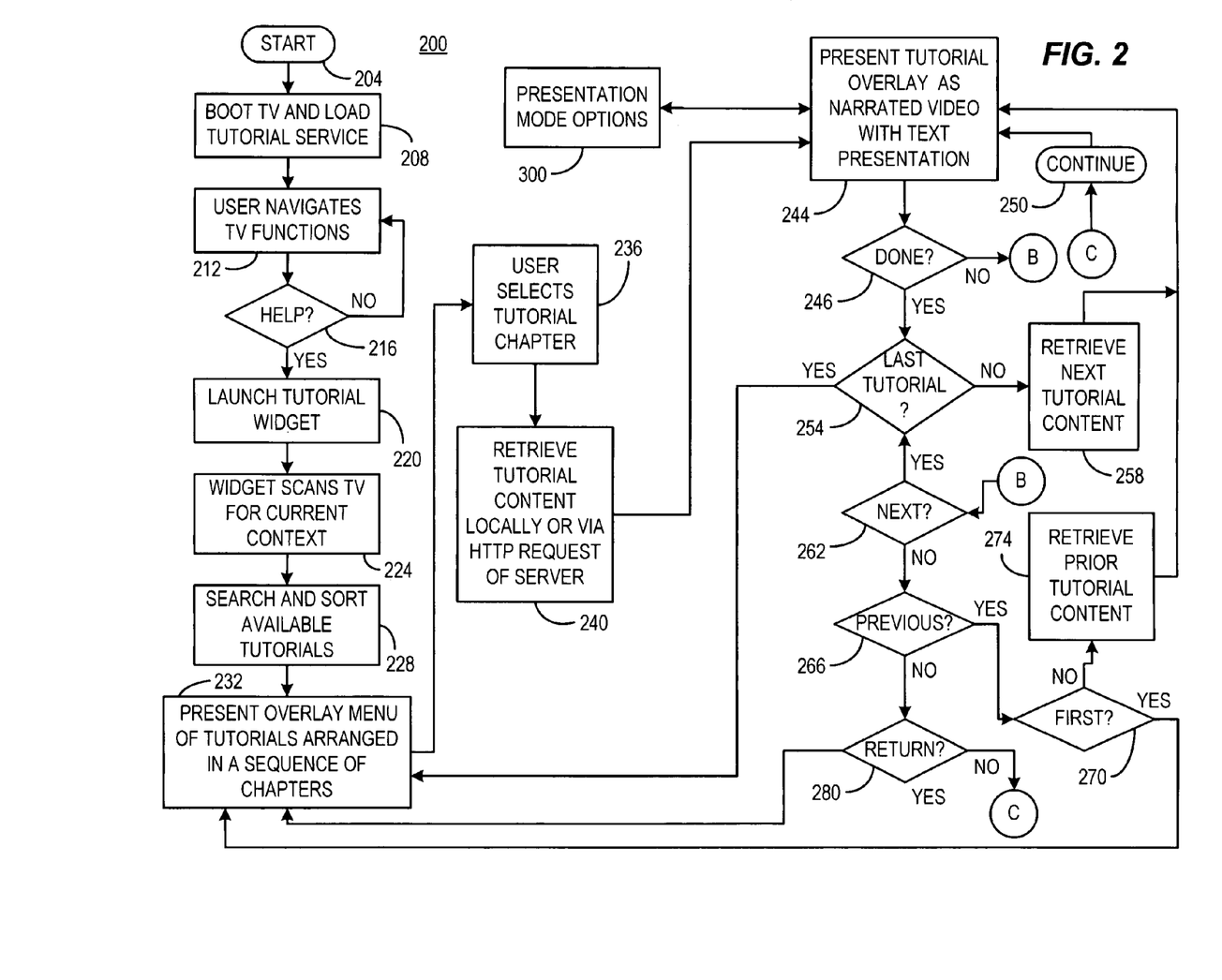
FIG. 2 is a flow chart depicting an example context sensitive tutorial Widget operation consistent with certain embodiments of the present invention.

Now consider one implementation consistent with certain embodiments of the invention in connection with FIG. 1 in which the tutorial function operates in a context sensitive mode. This implementation is discussed in connection with process 200 starting at 204 after which the TV boots up and the video tutorial service is loaded at 208. The video tutorial service can be present either on a local mass storage device 92 such as a Hard Disc Drive (HDD) or on a remote server such as 44. Note that at this point in time, the video tutorial Widget is not yet launched. The tutorial Widget in this implementation is only launched on demand.

The user navigates around on the TV interface at 212, which could include of several non-limiting navigable feature areas (such as: Settings, TV channels, Internet video channels, external inputs and other Widgets, such as email, weather, clock, RSS feeds, photo album, etc.). Such navigation can continue normally until such time as the user actuates a "HELP" button on the remote control at 216. In response to the command from the remote controller, the video tutorial Widget is launched at 220. The Widget scans the TV for its current context (e.g., is the TV displaying a selected menu function, or is the user attempting to operate a setting selection, location, has the user navigated to the "settings" selection of the XMB, highlighting "PICTURE". etc.) at 224. The Widget then lists a series of available video tutorials in order of relevance. To do this, a search and/or sort operation is carried out at 228, either by use of data stored in the TV's mass storage, on a remotely located server or a combination thereof. In this manner, the user is presented with a likely match or set of matches for the current context, and can readily obtain help in the context.

Consider for example, for the case where the search is done on the TV, a special keyword (not from user input but from discovery of the current context), say "XMB settings Picture" is passed. This can be detected because the TV is aware of what state it is in through the use of an application ID for a specific page. This ID is mapped to the keyword (in this case, "XMB settings Picture"), which is then passed to the video tutorial Widget. Alternatively, the TV can also detect the keyword based on the highlighted text in the menu of that page. When the video tutorial Widget receives the keyword passed in from the TV main application, it performs a search through the tutorial's library of videos on the server or HDD and filters out irrelevant videos, leaving behind a list of relevant videos. The TV then requests the most relevant video from the tutorial server 44 via an HTTP request, for example. In another implementation, the video tutorial Widget itself can also determine the current state of the TV by reading the registry of the TV, or via other similar software mechanisms, and then use the information to search for the relevant video tutorials. In the case of a use of a cross media bar menu or other menu system of the TV, a determination of the context may be as simple as determining that the menu system is active and that a particular function is highlighted. For example, if a menu is active and a menu selection for favorite channels is highlighted, the tutorial Widget can readily deduce that the user may be interested in tutorial topics such as the menu system, favorite channel display, favorite channel programming, favorite channel editing, favorite channel selection, changing channels, etc. with declining likelihood of relevance. In other examples, if the user is actively using a video source, Widgets relevant to that video source may be of relevance. Hence, any data element that defines a state of operation of the television set can be examined in as a parameter for use in searching for relevant videos that either reside within memory 80 or 92 in the television or external to the television in a local storage source (e.g., on a connected digital video recorder/player), on a connected home entertainment server, or on tutorial server 44. In certain embodiments, the Widget's search for relevant videos is not limited to the immediate domain of the television, but can extend the search beyond that domain to connected devices, home networked devices and devices accessible via the Internet. Such searches may be carried out via an HTTP request, for example, that can be directed to a local network or a tutorial server 44 or other Internet accessible resources.

In another example, the search is done on the tutorial server. In this case, the keyword or words are passed to the tutorial server 44, which then returns a list of pre-sorted videos and starts playing the most relevant video.

Relevance to the key word or words is used to place the most relevant videos at the top of the list of videos and in certain implementations can be ranked with priorities as follows: 1) Current Page (general tutorial on XMB), 2) Highlighted Object (general tutorial on "PICTURES" tab), 3) Tutorials in Highlighted Object, if any, and 4) General Tutorials in other settings under the settings column.

In another example the user may be accessing an external service or web site such as the "Youtube™" Service (Youtube LLC, provided by Google Inc. of Mountain View, Calif.) under the IP channel is highlighted. Examples of relevant videos on the list (which may in certain embodiments be in some order of relevance, for example, Youtube (because it is highlighted), XMB, other IP channels, etc. . . . ) can be XMB, General tutorial for Youtube UI, Specific tutorials in Youtube, if any, and General tutorials for other services (or UI) in IP channel. The relevant videos which describe how to use specific features in TV's IP channel service would be displayed.

In another example, if a "NEWS" Widget under the Widgets column is highlighted, relevant videos on the list can be XMB, General tutorial for "NEWS" Widget, Specific tutorials for "NEWS" Widget, if any, and General tutorials for other Widgets in the Widgets Column.

In any event, after a list of available relevant tutorials is obtained and sorted, the overlay of the Widget platform is brought up and presented at 232 arranged as a sequence of tutorials or chapters, taking up the entire screen or a part of it, and the most relevant video (e.g., the general tutorial on XMB in certain examples) will be played. The user, however, has the option of switching to another video if this is not the video the user is expecting. To do this, the user simply presses a key on the remote control to bring up a list of relevant videos, ranked by the method described earlier.

To select a video, the user simply navigates to the corresponding video and selects it at 236. This will send a HTTP request to the server requesting for the selected video or alternatively will retrieve a locally stored video, each of which is represented by 240. Upon return, the video will be played on the video tutorial Widget, in one implementation as a narrated video overlay with associated text presentation material that can be in the form of step by step guidance at 244.

In one implementation, in the absence of any user action, the video plays until it is done at 246 following the path of continuing at 250 until done. When the tutorial is finished at 246, if the last tutorial has been played, the process returns to display of the menu of tutorials at 232. But in certain implementations, if the tutorial is done at 246 and it is not the last of the displayed videos at 254, the next video is retrieved at 258 and the process returns to 244 where the next tutorial is presented. This sequence of actions can continue until the last tutorial on the list is viewed and control returns to, for example, 232 where the tutorial menu is displayed. In other embodiments, the process can revert to the XMB menu or other appropriate point of termination.

In another example, simple playback path can be interrupted if during playback the user selects the "next" button from the remote controller at 262, and provided there is another tutorial on the list at 254, the next tutorial will be retrieved at 258 and played at 244. Similarly, at 266, if the user elects to go back to a previous tutorial at 266, and the current tutorial is not the first on the list at 270, then the prior tutorial is retrieved at 274 and playback thereof commences at 244 as before. Additionally, the user can elect to end the playback (e.g., using a stop, return, end or menu command) at 280 to return to 232 or other suitable destination point. Presentation mode options are depicted as 300.

Figure 3:
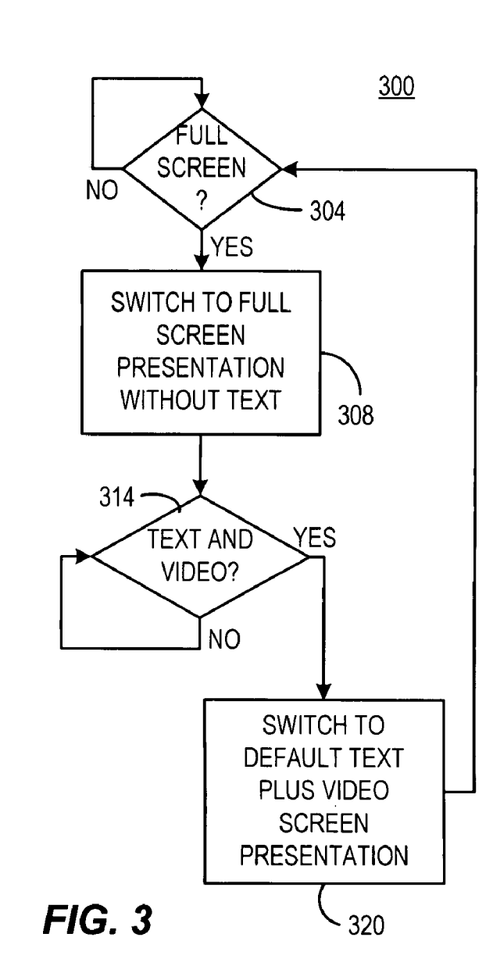
FIG. 3 is a flow chart depicting example presentation mode options of full screen display consistent with certain embodiments of the present invention.
Figure 4:
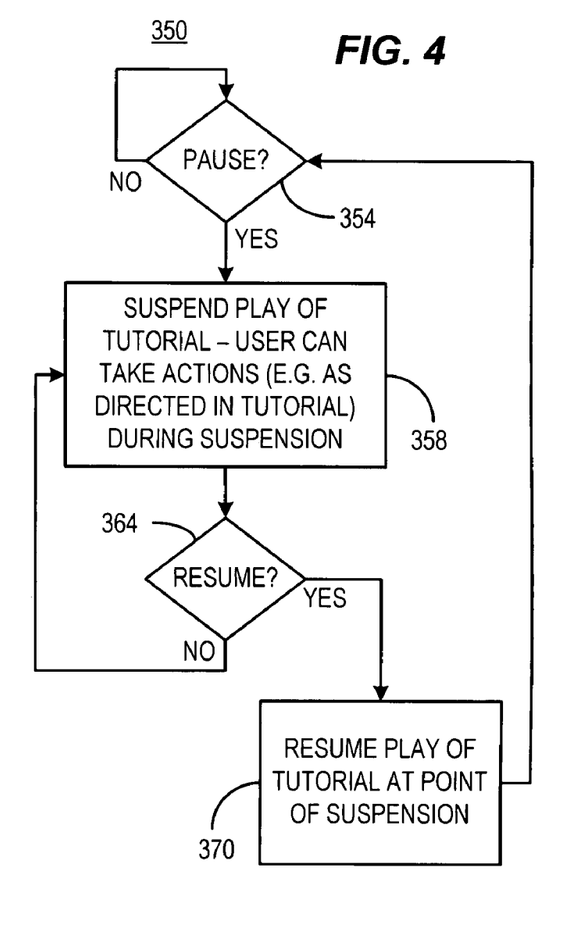
FIG. 4 is a flow chart depicting example presentation mode options of pausing the tutorial consistent with certain embodiments of the present invention.

While the video tutorial is playing at 244, many user options are available and can be readily provided for using processor interrupts or other programming techniques. FIGS. 3 and 4 provide two simple examples of such functions. In FIG. 3 process 300 depicts switching between a default screen mode (as depicted by example in FIG. 9) to a full screen mode which only depicts the narrated video. In this example process 300, the screen is in its presumed default mode of display of text plus narrated video unless the user makes an on-screen menu or remote control selection to switch to full screen mode at 304. When such selection is made, the mode of display is switched to full screen presentation mode without text at 308. In full screen mode, the window at the right that carries the tutorial presentation is expanded to fill the entire screen with the text deleted. One could readily envision a similar mode that switches to text only upon consideration of the present discussion. Once in this full screen mode, the mode stays the same unless the text and video mode is selected at 314 at which point the system switches to default display mode at 320.

FIG. 4 depicts a useful aspect of the tutorial mode as process 350 in which a user can elect to pause the tutorial at 354, again in response to a remote or menu command from the user. This results in suspension of play of the tutorial at 358 and reverting to normal television operation. As a consequence, the user can pause to take an action that has just been described in the tutorial. The tutorial can be resumed from this suspended state at 364 by pressing a resume button, the pause button again or taking a menu driven action in order to pick the video up at the point of pausing. This resumes play at 370. The user can do this repeatedly to step through a sequence of actions that are being described in the tutorial.

The user may, anytime, turn off the Widget overlay. This automatically pauses the video and reveals what was previously on the screen earlier, (e.g., XMB page with PICTURES highlighted under the Settings Column). This permits the user to follow the steps previously revealed in the video (e.g., entering the PICTURES page). The user may, at any time, turn the Widget overlay back on. The control of the screen now returns to the video tutorial Widget, which resumes playing from where it has left off. To do a resume, there are at least two ways. The first way is to not terminate the video tutorial Widget, i.e. to leave it running in paused mode in the background as described in connection with process 350. This, however, is a memory expensive method. The second way is to put the video ID and the time played into the system registry or otherwise store the last position viewed in the tutorial. On resume, the video ID and the time played will be passed into the video tutorial Widget, which will then request the video from the server and play it from the time recorded in the system registry. When the video tutorial has finished playing, the overlay can automatically be turned off (by the video tutorial Widget) and control is returned to the state it was previously.

In one example, a video identifier and time played can be placed in the system registry upon execution of a pause function for the tutorial Widget. In this manner, the user may resume the video tutorial at any time without need to recall where they left off in the video. Regardless of the time (e.g., runtime, frame count, etc.) at which the video was paused, the appropriate video and location in the video can be retrieved at a later time without any complex action by the user. The user can simply execute a resume command. This process does not occupy valuable memory resources within the TV because once the Widget saves the video ID and a time marker within the registry, the Widget can unload itself from the TV memory and release those resources back to the TV for other purposes. When the user presses the resume button, the Widget is reloaded, determines the fact that there was a pause in a playing video (e.g., by virtue of existence of a registry entry with a video ID and a time) and then retrieves the video and begins playing again at the point where the video was paused. This removes need for the viewer to recall how much of the video was viewed regardless of how long the video was paused as long as no interceding video has been selected prior to pressing the resume button.

Figure 5:
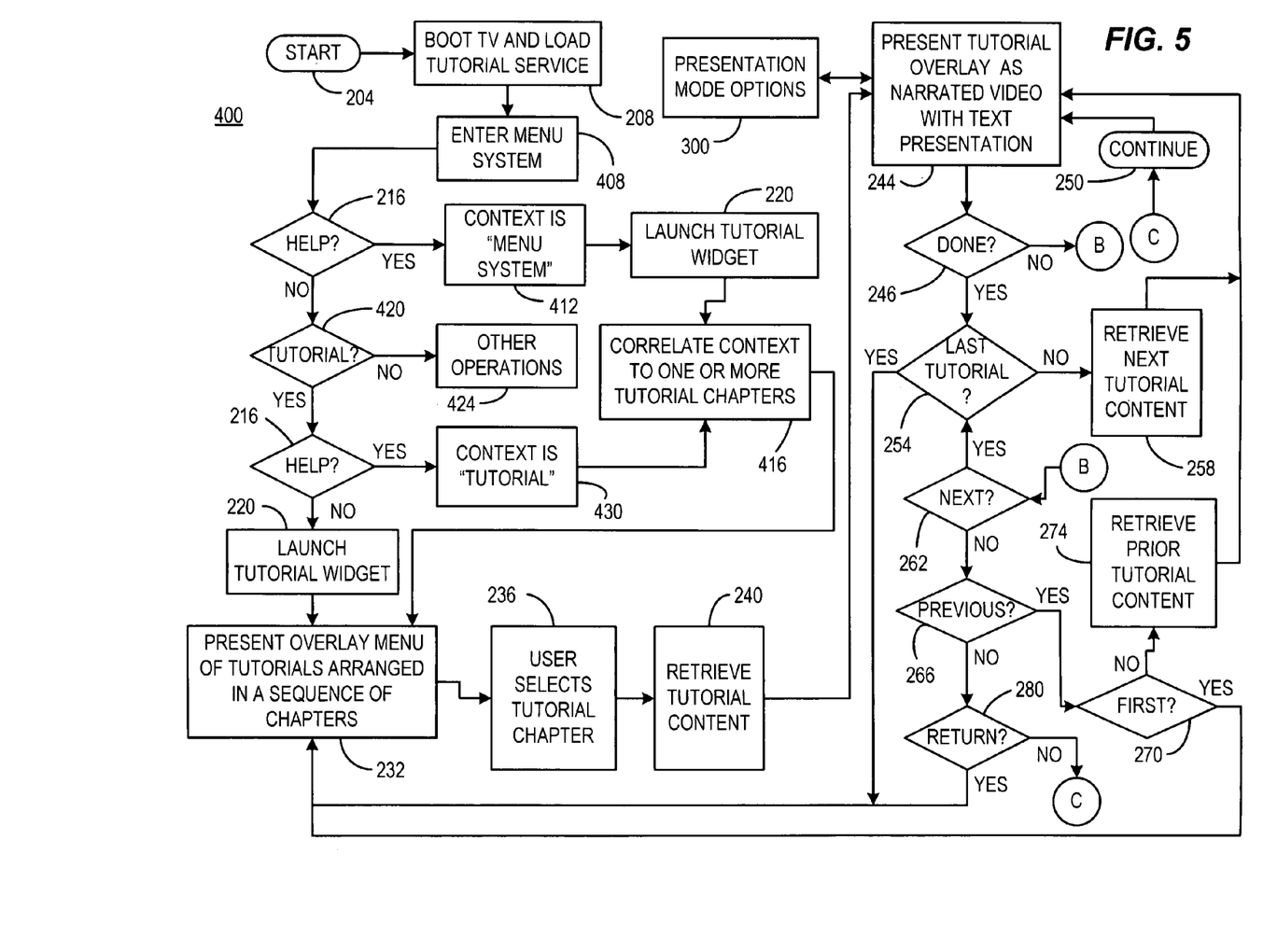
FIG. 5 is a flow chart depicting an example menu driven tutorial Widget operation consistent with certain embodiments of the present invention.

FIG. 5 depicts a process 400 for using the video tutorial Widget with entry from a help icon in the menu system. For example purposes, the menu system will be an XMB style menu such as menu 500 depicted in FIG. 6. In this menu, menu selections are arranged in a cross patterns with main functional groups arranged horizontally as shown as 510 and related functions arranged vertically as 520. The tutorial function is depicted as 530 to which the user navigates using conventional navigation techniques.

Process 400 starts at 204 and can occur as an integral part of process 200, but has been separated out in order to clarify the distinctions. However, the context sensitivity is depicted in certain areas of process 400 to show how they are integrated. Commonly numbered functions are as described previously. The TV boots and loads the tutorial service as before at 208. The user navigates to the menu system at 408. Should the user press help at this point, the context is defined as the "menu system" or "XMB" or the like at 412 and the tutorial Widget is launched in that context at 224. Context sensitive operation per process 200 is then initiated at 224 and 228 thereof at 416. If the user does not select tutorial at 420, other selected operations can be carried out in a conventional fashion at 424.

If "help" is executed after selection of the tutorial at 420, the context is defined as help with the tutorial at 430 in which case the context is used to play a tutorial about the tutorial function by processing at 41 6.

Figure 6:
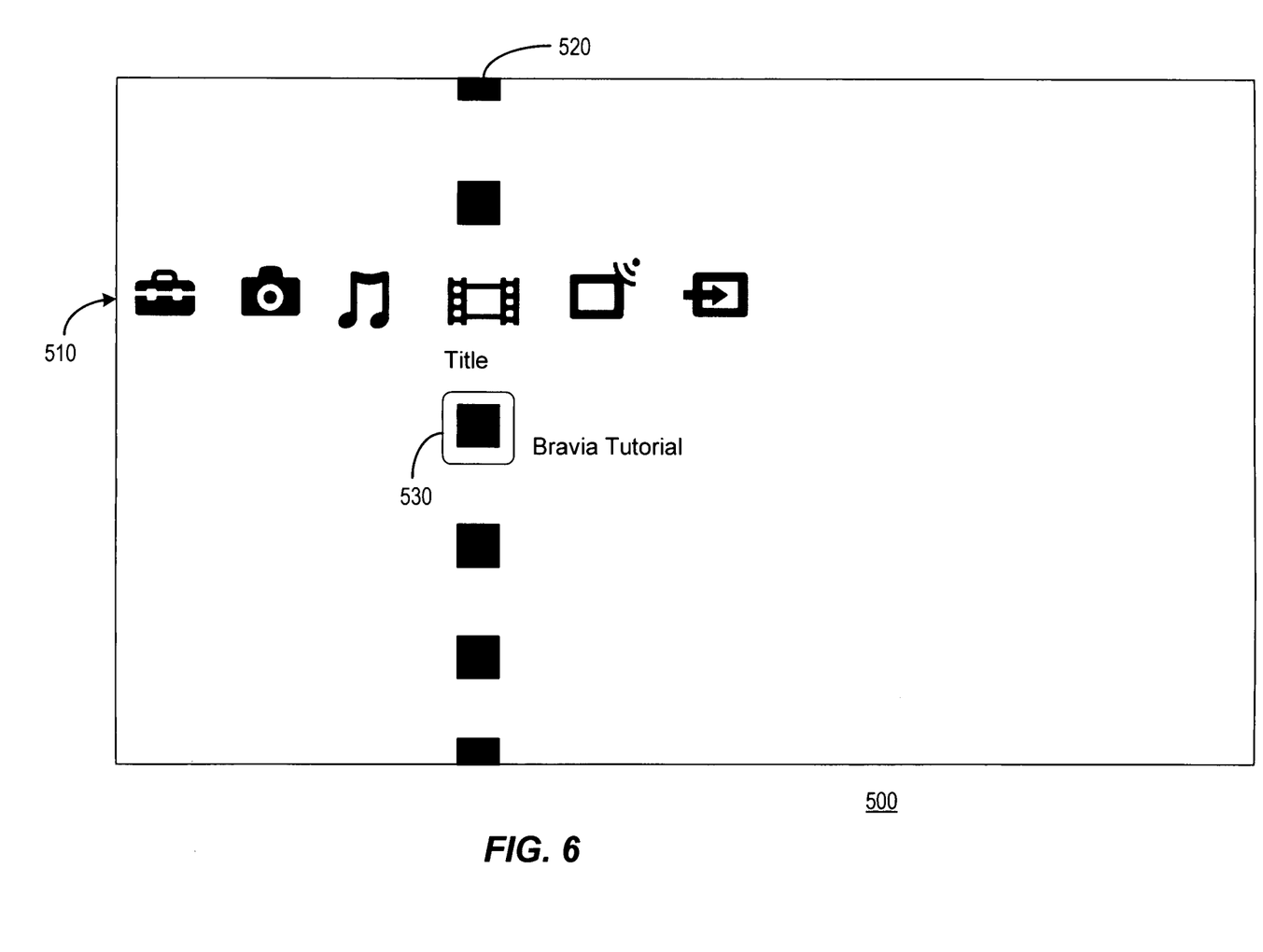
FIG. 6 is an example simulated screen shot consistent with certain embodiments of the present invention.

But, under normal circumstances, if the tutorial button 530 is selected, it is equivalent to selecting a video tutorial channel on the XMB and the tutorial Widget is launched at 220. On entering the tutorial, a list of all video tutorials is presented in the channel, in terms of categories. The user may navigate through the categories to the video tutorial the user is looking for or do a search on the videos by inputting a keyword in the search tool, which will bring up a list of relevant searches. Like before, the search may be done on the TV's mass storage or on the server or some combination thereof. If the "server" is actually a local HDD, a search cannot be performed by the HDD, but data on the HDD can be searched for relevant tutorials.

On selection, the TV sends a HTTP request to the server, which will return the requested video as before. The video tutorial Widget on the overlay is then brought up, and the video tutorial is played as before. Operation proceeds from there in the manner described in connection with process 200.

In another implementation variation, the process for using video tutorial Widget, a Help Wizard brings user to an actual wizard page or a separate setup wizard. This process is similar to the implementation example shown as process 200 above. However, in this case, text pages are interactively displayed as text help pages rather than video tutorial style help pages. Once the user is in a specific area of the TV in which assistance is needed, pushing the "HELP" button on the remote control will display possibilities of help options, preferably in a transparent-type text box overlaying the current screen on the TV. This text box displays a list of options asking the user what he wants help in. As before the TV context is detected so that the most relevant help pages are requested from local storage or the server via an HTTP request or a combination thereof. Once the search is done, the response is parsed so as to display possible options that the user might need help in, on how to use a specific setting on the TV.

By way of example, the server can give an option of three different areas that the user may need help in. The user will be able to select one option, in which case another parsed response from the server will display a detailed step-by-step text on how to use a specific feature. The textual responses can also be displayed using the Widget overlay. In this case, the user can decide to hide or unhide the textual responses.

Below are two example ways to implement a HELP wizard in order to modify brightness attributes as follows:

In the first method, the video tutorial can mimic the actual pages that the user would have to go through if the user were to do it without the HELP tool. For example, to change "Brightness" attribute in "PICTURES" settings, the mimicked. The XMB menu system is pulled up with tags telling the user to navigate to the settings column and down to the "PICTURE" setting. (Where to start may also be related to where the user originally is when the HELP tool is requested, instead of a single standard way, in other words, a dynamic start point may be used to provide a more seamless experience.) The user is instructed to click on the "PICTURE" setting and then navigate down to the back light, where the user will then choose the level of the backlight. The video tutorial Widget then remembers the values and passes the information dynamically to the TV which then implements changes to the TV settings. On the termination of the tutorial Widget, information is passed to the TV so that the TV can sync up with the video tutorial Widget and display the screen which the tutorial Widget is showing before termination, ie Picture Settings in one example case.

A second method involves presenting a totally separate UI page with HELP options based on the HELP given. In this page, the user keys in directly what the level of backlight the user hopes to configure. Upon completion, or dynamically the video tutorial Widget passes the information to the TV which then incorporates the changes to the TV settings. The control is returned to the TV, which will reveal the state before the tutorial Widget is launched.

Figure 7:
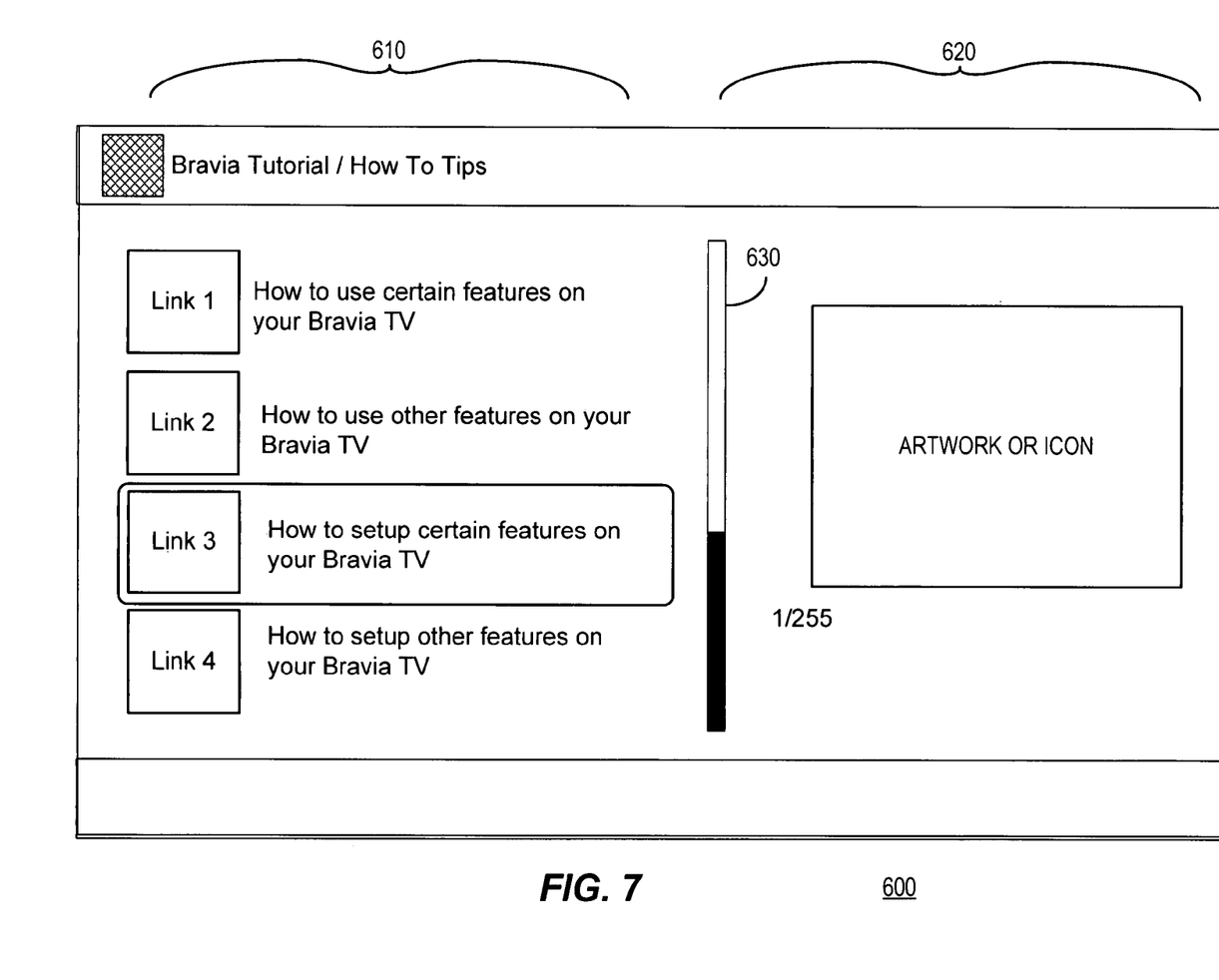
FIG. 7 is an example simulated screen shot consistent with certain embodiments of the present invention.

Referring back to FIG. 6, the tutorial Widget process 400 is depicted in part using simulated screen shots to illustrate operation. In this process, the user navigates to screen 500 to get to the XMB menu system. By selection of tutorial 530, screen 600 of FIG. 7 appears. In this screen, the user is presented with a number of menu options shown as link I through link 4 on the left region 610 of the screen. The right side of the screen has artwork or an icon in region 620 that will be separated by a progress bar 630 that indicates the user's location in the list of links in region 610.

Figure 8:
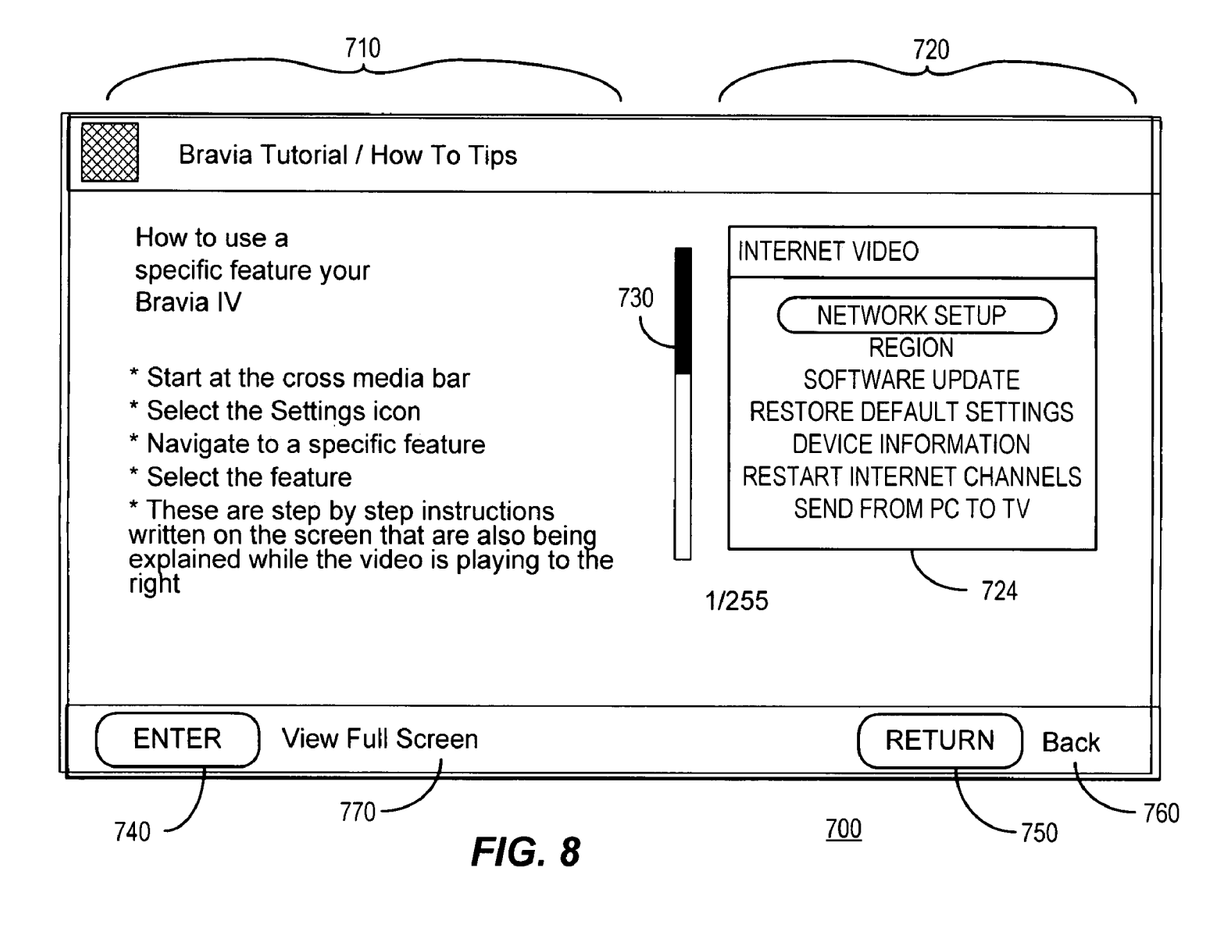
FIG. 8 is an example simulated screen shot consistent with certain embodiments of the present invention.

FIG. 8 shows a simulated screen shot 700 depicting selection of a particular tutorial. This screen shot shows narrative text on the left side 710 and a video display 720 at the right side as 724 separated by a progress bar 730. In this simulated screen, various submenu options are depicted from which the user can select a tutorial to view. However, it will be clear that other layouts of the screen for any of the present simulated screen shots may be used without departing from embodiments consistent with the present invention. The user can select the enter button 740 to play the video, or the return button 750 to go back to the main menu level. The Back button 760 can be used to go back a level in the menu hierarchy. The full screen button 770 can be used to switch to the full screen view. Other functions can be carried out directly from the remote controller.

Figure 9:
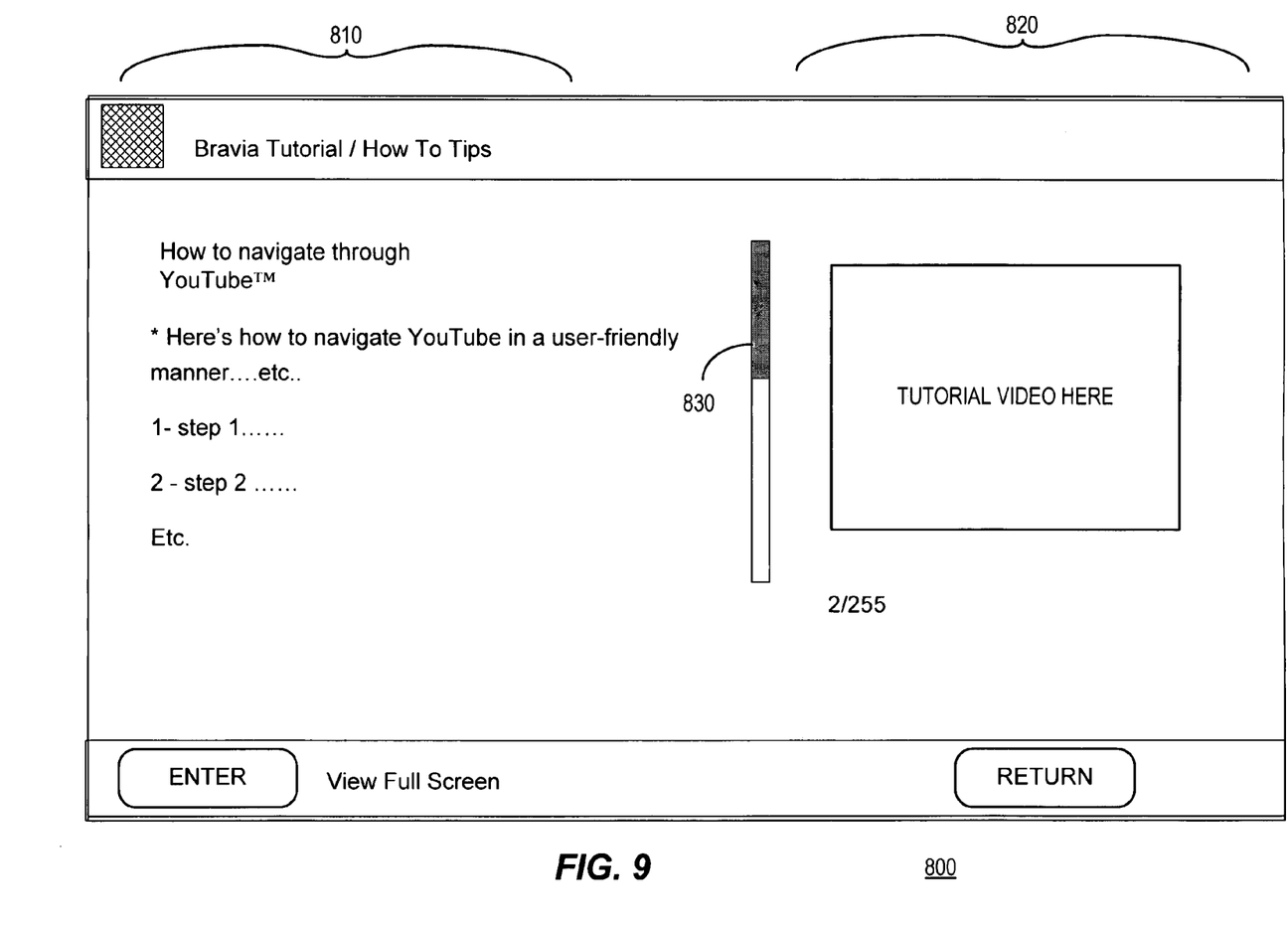
FIG. 9 is an example simulated screen shot consistent with certain embodiments of the present invention.

Once another tutorial is selected, a screen such as screen 800 of FIG. 9 appears in which a similar layout persists so as to remain familiar to the user. In this screen, detailed steps or other text is provided at the left side 810 with the tutorial video being shown on the right side at 820 separated again by a progress bar 830. Various control buttons such as enter, return and full screen can be provided at the bottom of the screen or in any other suitable location to facilitate user control.

Figure 10:
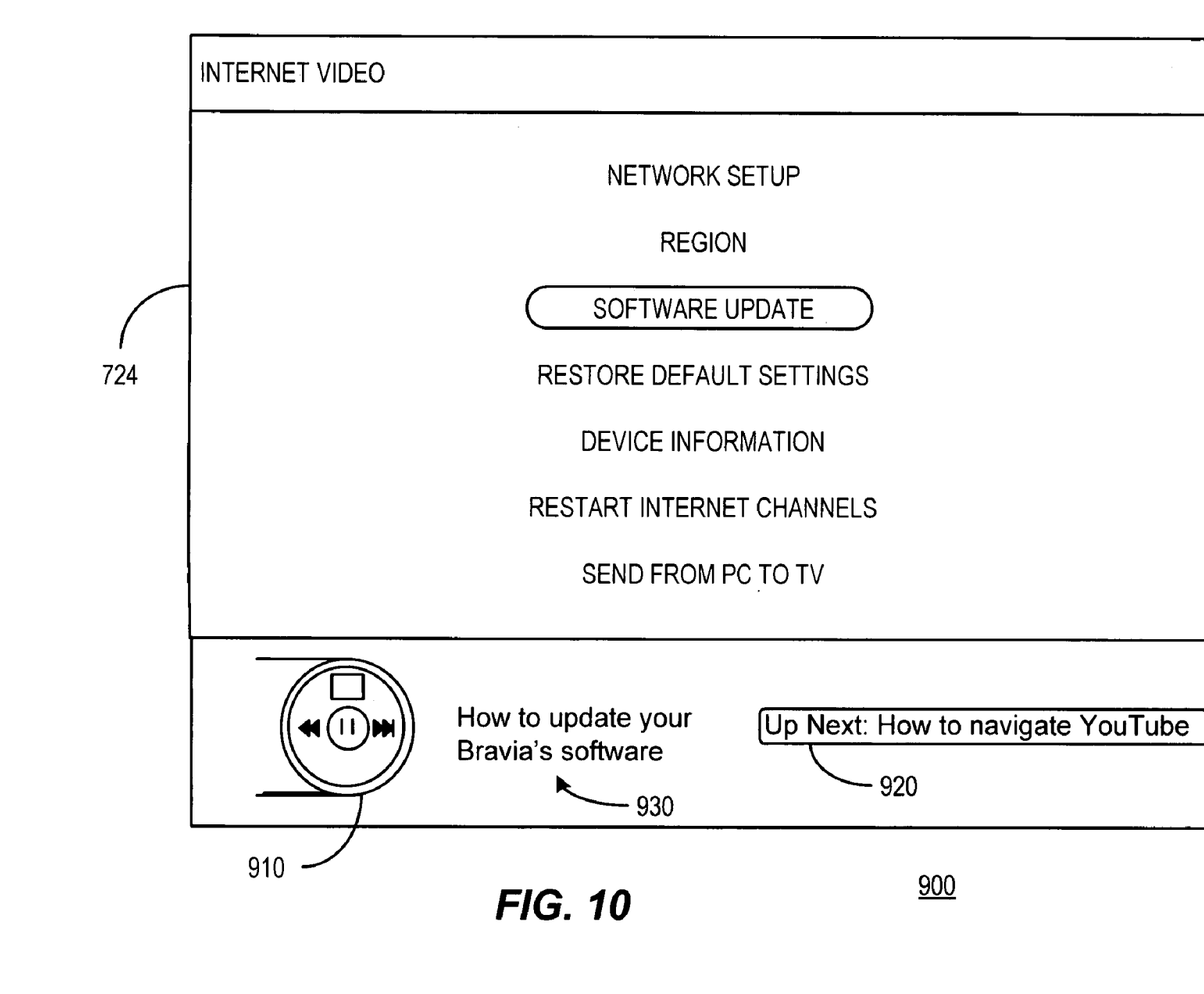
FIG. 10 is an example simulated screen shot consistent with certain embodiments of the present invention.

If the user viewing screen 700 wishes to see a full screen view, an image such as 900 of FIG. 10 can be presented in which case the image shown as 724 is expanded to full screen or near full screen as 900. In addition, the screen can contain guidance such as the symbols 910 at the lower left indicating that the video can be played using conventional video playback controls on the remote controller as well as a message 920 that informs the user of a next available video that the user may find of interest, and a message that explains the current menu selection at 930.

Figure 11:
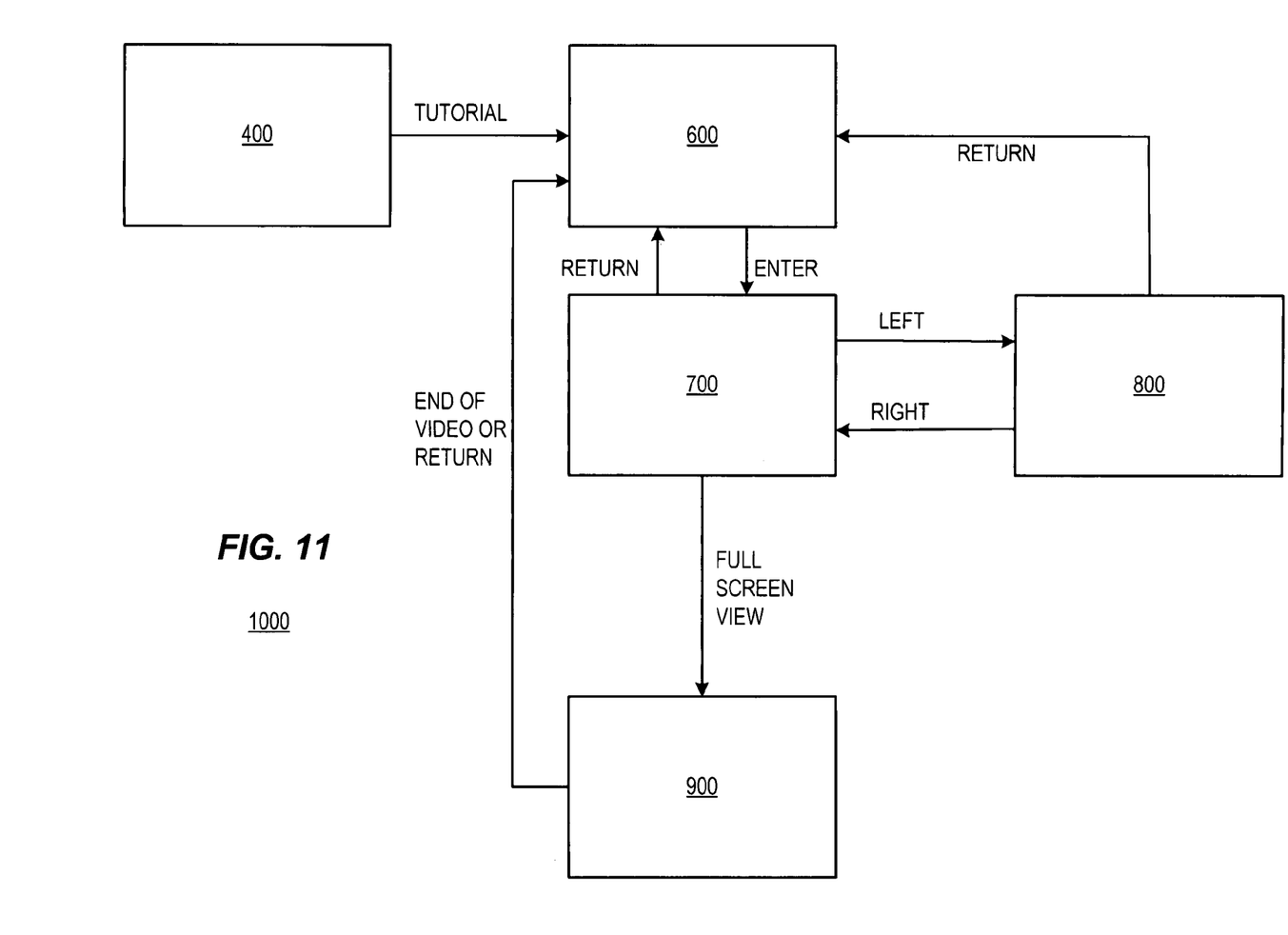
FIG. 11 is a map illustrating navigation among the example screen shots 400, 600, 700, 800 and 900 consistent with certain embodiments of the present invention.

FIG. 11 depicts an illustrative chart 1000 showing the pathways from one screen to another that a user might traverse and the commands used to navigate among those screens. Of note is that the experienced user can navigate to various screens using the left, right, up and down navigation arrows as well as the enter, return, menu, help and other remote controller keys.

Since the overlay platform can be freely activated and deactivated to show the video tutorial, because the platform has minimal interactions with and dependencies on the TV's native applications, and since the video tutorial can be paused and resumed, permits the video tutorial to not only exist anywhere on the TV but also allows the user to perform step-by-step procedures while the tutorial is played allowing full interaction giving the user the confidence to learn and troubleshoot the features of the TV concurrently with the tutorial's explanations, just as if the physical manual is front of them and they're following it in steps, rather than having to digest and remember the entire tutorial. This further permits elimination of paper manuals and minimizes calls to the help center. Feature recommendation, new feature introductions and feature optimizations can also be included as content. This allows the users to not only know more about the TV, but also to use the TV in its most optimized settings, which typically comes from the advice of the experts.

Thus, a television set consistent with certain implementations has a television receiver that receives television content from any suitable source of television content for display as a picture on a display. A television processor resides within the television receiver. A tutorial Widget runs on the television processor to produce video images rendered as a video overlay that overlays the picture on the display. The tutorial Widget operates to: load upon receipt of a command to run the tutorial Widget; identify an operating state of the television set; retrieve and present a list of available tutorial videos associated with the operating state of the television set in the video overlay; identify a tutorial video selected by a user; and retrieve and play the tutorial video selected by the user in the video overlay.

In certain implementations, the video tutorials are retrieved and played from storage residing within the television set. In certain implementations, the video tutorials are retrieved and played from storage residing on a server accessed via either a home network or over the Internet. In certain implementations, the operating state of the television set is ascertained at least in part by reading state information in a registry. In certain implementations, the operating state of the television set is ascertained at least in part by determining that the television set is in a menu mode, and by a highlighted position of the menu. In certain implementations, the list of available tutorial videos is obtained by a search of resources within the television set combined with a search of resources available from Internet resources. In certain implementations, the Widget further operates to respond to a pause command by stopping and storing a tutorial video identifier and a tutorial time indicator indicating a play position in the tutorial video. In certain implementations, the Widget further operates to unload itself from memory after storing the tutorial video identifier and tutorial time indicator. In certain implementations, the Widget further operates to resume playing the tutorial video upon receipt of a resume command at the time of the video indicated by the time indicator. In certain implementations, the Widget further operates to reload to memory and resume playing the tutorial video upon receipt of a resume command at the time of the video indicated by the time indicator.

In another implementation, a television tutorial Widget method involves providing a tutorial Widget running on a television processor to produce video images rendered as a video overlay that overlays the picture on a television display. The tutorial Widget: loading upon receipt of a command to run the tutorial Widget; identifying an operating state of the television set; retrieving and presenting a list of available tutorial videos associated with the operating state of the television set in the video overlay; identifying a tutorial video selected by a user; and retrieving and playing the tutorial video selected by the user in the video overlay.

In certain implementations, the television tutorial Widget runs on a television processor residing at one of a television set and a television set top box. In certain implementations, the video tutorials are retrieved and played from storage residing within a television set. In certain implementations, the video tutorials are retrieved and played from storage residing on a server accessed via either a home network or over the Internet. In certain implementations, the operating state of the television set is ascertained at least in part by reading state information in a registry. In certain implementations, the operating state of the television set is ascertained at least in part by determining that the television set is in a menu mode, and by a highlighted position of the menu. In certain implementations, the list of available tutorial videos is obtained by a search of resources within a television set combined with a search of resources available from Internet resources. In certain implementations, the Widget further operates to respond to a pause command by stopping and storing a tutorial video identifier and a tutorial time indicator indicating a play position in the tutorial video. In certain implementations, the Widget further operates to unload itself from memory after storing the tutorial video identifier and tutorial time indicator. In certain implementations, the Widget further operates to resume playing the tutorial video upon receipt of a resume command at the time of the video indicated by the time indicator. In certain implementations, the Widget further operates to reload to memory and resume playing the tutorial video upon receipt of a resume command at the time of the video indicated by the time indicator.

A television set consistent with certain implementations, has a television receiver that receives television content from any suitable source of television content for display as a picture on a display. A television processor resides within the television receiver. A tutorial Widget runs on the television processor to produce video images rendered as a video overlay that overlays the picture on the display. The tutorial Widget operates to: load upon receipt of a command to run the tutorial Widget; identify an operating state of the television by either reading state information in a registry or by determining that the television set is in a menu mode, and by a highlighted position of the menu; retrieve and present a list of available tutorial videos associated with the operating state of the television set in the video overlay, wherein the list of available tutorial videos is obtained by a search of resources within the television set combined with a search of resources available from Internet resources; identify a tutorial video selected by a user; retrieve and play the tutorial video selected by the user in the video overlay, wherein the video tutorials are retrieved and played from either storage residing within the television set or from storage residing on a server accessed via either a home network or over the Internet; respond to a pause command by stopping and storing a tutorial video identifier and a tutorial time indicator indicating a play position in the tutorial video; resume playing the tutorial video upon receipt of a resume command at the time of the video indicated by the time indicator.

In certain implementations, the Widget further operates to unload from memory after storing the video identifier and tutorial time and reload to memory and resume playing the tutorial video upon receipt of a resume command at the time of the video indicated by the time indicator.

A computer readable electronic storage medium can store instructions which, when executed on the programmed television processor, can implement any embodiment of the Widgets described above.

Those skilled in the art will recognize, upon consideration of the above teachings, that certain of the above exemplary embodiments are based upon use of a programmed processor. However, the invention is not limited to such exemplary embodiments, since other embodiments could be implemented using hardware component equivalents such as special purpose hardware and/or dedicated processors. Similarly, general purpose computers, microprocessor based computers, micro-controllers, optical computers, analog computers, dedicated processors, application specific circuits and/or dedicated hard wired logic may be used to construct alternative equivalent embodiments.

Certain embodiments described herein, are or may be implemented using a programmed processor such as TV processor 72 executing programming instructions that are broadly described above verbally and in flow chart form that can be stored on any suitable electronic or computer readable storage medium. However, those skilled in the art will appreciate, upon consideration of the present teaching, that the processes described above can be implemented in any number of variations and in many suitable programming languages without departing from embodiments of the present invention. For example, the order of certain operations carried out can often be varied, additional operations can be added or operations can be deleted without departing from certain embodiments of the invention. Error trapping can be added and/or enhanced and variations can be made in user interface and information presentation without departing from certain embodiments of the present invention. Such variations are contemplated and considered equivalent.

While certain embodiments herein were described in conjunction with specific circuitry that carries out the functions described, other embodiments are contemplated in which the circuit functions are carried out using equivalent executed on one or more programmed processors. General purpose computers, microprocessor based computers, micro-controllers, optical computers, analog computers, dedicated processors, application specific circuits and/or dedicated hard wired logic and analog circuitry may be used to construct alternative equivalent embodiments. Other embodiments could be implemented using hardware component equivalents such as special purpose hardware and/or dedicated processors.

While certain illustrative embodiments have been described, it is evident that many alternatives, modifications, permutations and variations will become apparent to those skilled in the art in light of the foregoing description.

What is claimed is:

1. A television set, comprising:
    a television receiver configured to receive television content from any suitable source of television content for display as a picture on a display;
    a television processor residing within the television receiver;
    a tutorial Widget configured to run on the television processor to produce video images rendered as a video overlay that overlays the picture on the display;
    the tutorial Widget being programmed to:
        load for execution on the television processor as a result of the television receiving a user command to run the tutorial Widget;
        identify an operating state of the television set;
        conduct a search for available tutorial videos that are associated with the identified operating state of the television set in order to retrieve a list of available tutorial videos that are associated with the identified operating state of the television set;
        present the list of available tutorial videos associated with the identified operating state of the television set to the user in the video overlay for selection of a tutorial video by the user;
        identify a tutorial video selected by a user;
        retrieve the tutorial video selected by the user; and
        play the tutorial video selected by the user in the video overlay.

2. The television set according to claim 1, wherein the video tutorials are retrieved and played from storage residing within the television set.

3. The television set according to claim 1, wherein the video tutorials are retrieved and played from storage residing on a server accessed via either a home network or over the Internet.

4. The television set according to claim 1, wherein the operating state of the television set is ascertained at least in part by reading state information in a registry.

5. The television set according to claim 1, wherein the operating state of the television set is ascertained at least in part by determining that the television set is in a menu mode, and by a highlighted position of the menu.

6. The television set according to claim 1, wherein the list of available tutorial videos is obtained by a search of resources within the television set combined with a search of resources available from Internet resources.

7. The television set according to claim 1, wherein the Widget further operates to respond to a pause command by stopping and storing a tutorial video identifier and a tutorial time indicator indicating a play position in the tutorial video.

8. The television set according to claim 7, wherein the Widget further operates to unload itself from memory after storing the tutorial video identifier and tutorial time indicator.

9. The television set according to claim 7, wherein the Widget further operates to resume playing the tutorial video upon receipt of a resume command at the time of the video indicated by the time indicator.

10. The television set according to claim 8, wherein the Widget further operates to reload to memory and resume playing the tutorial video upon receipt of a resume command at the time of the video indicated by the time indicator.

11. A television tutorial Widget method, comprising:
providing the tutorial Widget running on a television processor to produce video images rendered as a video overlay that overlays the picture on a television display;
the tutorial Widget:
loading to run on the television processor as a result of the television receiving a user command to run the tutorial Widget;
identifying an operating state of the television set;
conducting a search for available tutorial videos that are associated with the identified operating state of the television set in order to retrieve a list of available tutorial videos that are associated with the identified operating state of the television set;
presenting the list of available tutorial videos associated with the identified operating state of the television set to the user in the video overlay for selection of a tutorial video by the user;
identifying a tutorial video selected by a user;
retrieving the tutorial video selected by the user; and
playing the tutorial video selected by the user in the video overlay.

12. The television tutorial Widget according to claim 11, wherein the Widget runs on a television processor residing at one of a television set and a television set top box.

13. The television tutorial Widget according to claim 11, wherein the video tutorials are retrieved and played from storage residing within a television set.

14. The television tutorial Widget according to claim 11, wherein the video tutorials are retrieved and played from storage residing on a server accessed via either a home network or over the Internet.

15. The television tutorial Widget according to claim 11, wherein the operating state of the television set is ascertained at least in part by reading state information in a registry.

16. The television tutorial Widget according to claim 11, wherein the operating state of the television set is ascertained at least in part by determining that the television set is in a menu mode, and by a highlighted position of the menu.

17. The television tutorial Widget according to claim 11, wherein the list of available tutorial videos is obtained by a search of resources within a television set combined with a search of resources available from Internet resources.

18. The television tutorial Widget according to claim 11, wherein the Widget further operates to respond to a pause command by stopping and storing a tutorial video identifier and a tutorial time indicator indicating a play position in the tutorial video.

19. The television tutorial Widget according to claim 18, wherein the Widget further operates to unload itself from memory after storing the tutorial video identifier and tutorial time indicator.

20. The television tutorial Widget according to claim 18, wherein the Widget further operates to resume playing the tutorial video upon receipt of a resume command at the time of the video indicated by the time indicator.

21. The television tutorial Widget according to claim 19, wherein the Widget further operates to reload to memory and resume playing the tutorial video upon receipt of a resume command at the time of the video indicated by the time indicator.

22. A non-transitory computer readable electronic storage medium storing instructions which, when executed on the programmed television processor, implements the Widget according to claim 11.

23. A television set, comprising:
a television receiver that receives television content from any suitable source of television content for display as a picture on a display;
a television processor residing within the television receiver;
a tutorial Widget running on the television processor to produce video images rendered as a video overlay that overlays the picture on the display;
the tutorial Widget operating to:
load to the television processor as a result of the television receiving a user command to run the tutorial Widget;
identify an operating state of the television by either reading state information in a registry or by determining that the television set is in a menu mode, and by a highlighted position of the menu;
conduct a search for available tutorial videos that are associated with the identified operating state of the television set in order to retrieve a list of available tutorial videos that are associated with the operating state of the television set;
where the list of available tutorial videos is obtained by a search of resources within the television set combined with a search of resources available from Internet resources;
present the list of available tutorial videos associated with the operating state of the television set to the user in the video overlay for selection of a tutorial video by the user;
identify a tutorial video selected by a user;
retrieve the tutorial video selected by the user; and
play the tutorial video selected by the user in the video overlay, wherein the video tutorials are retrieved and played from either storage residing within the television set or from storage residing on a server accessed via either a home network or over the Internet;
respond to a pause command by stopping and storing a tutorial video identifier and a tutorial time indicator indicating a play position in the tutorial video;
resume playing the tutorial video upon receipt of a resume command at the time of the video indicated by the time indicator.

24. The television set according to claim 23, wherein the Widget further operates to unload from memory after storing the video identifier and tutorial time and reload to memory and resume playing the tutorial video upon receipt of a resume command at the time of the video indicated by the time indicator.

* * * * *